Apr. 17, 1923.
A. T. SAMPSON
1,452,169
SYSTEM OF ELECTRICAL CONSTRUCTION
Filed May 7, 1917
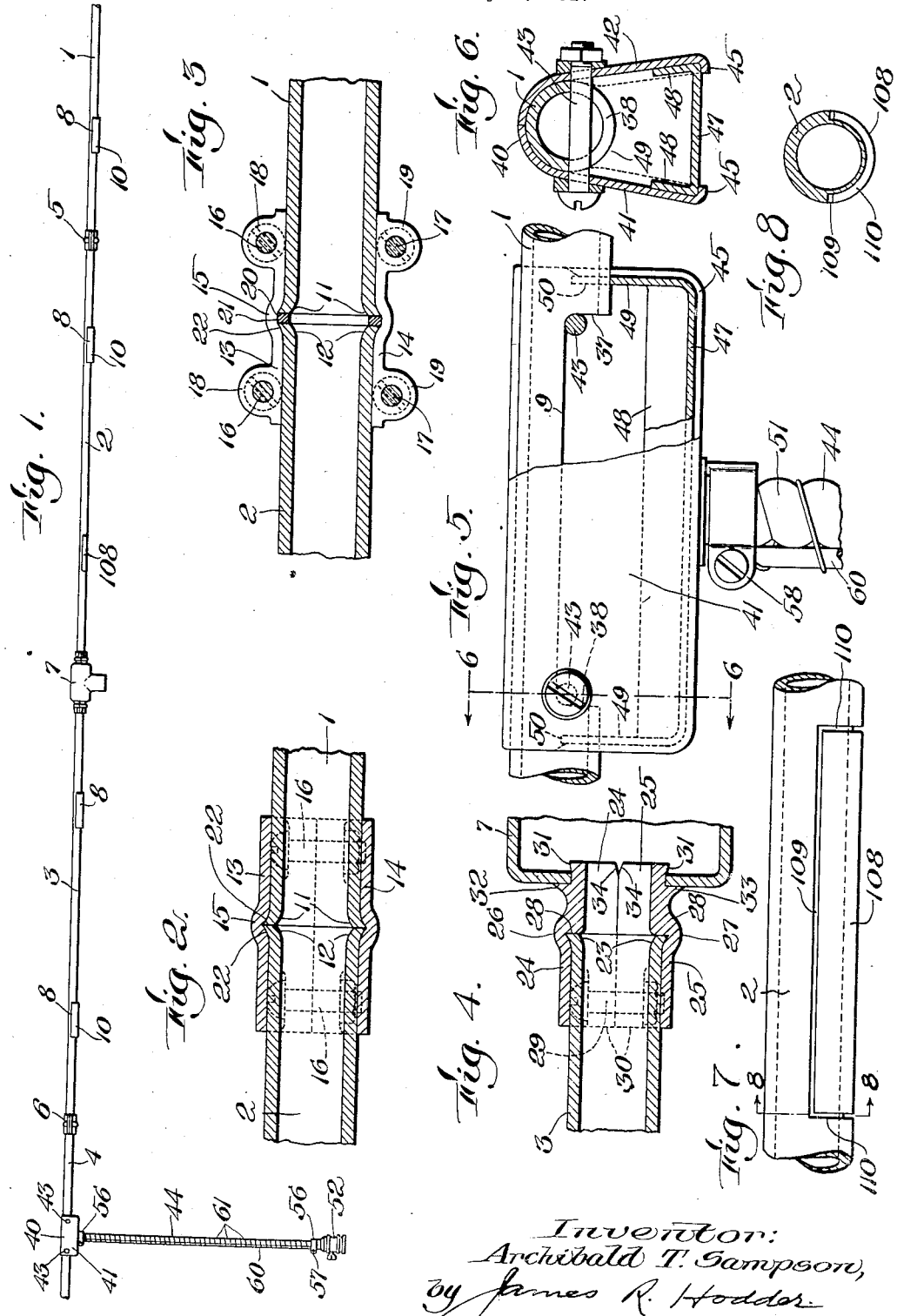
Inventor:
Archibald T. Sampson,
by James R. Hodder
Attorney.

Patented Apr. 17, 1923.

1,452,169

UNITED STATES PATENT OFFICE.

ARCHIBALD T. SAMPSON, OF LYNN, MASSACHUSETTS, ASSIGNOR TO SAMPSON AXCESS SYSTEM, INC., OF LYNN, MASSACHUSETTS, A CORPORATION OF MASSACHUSETTS.

SYSTEM OF ELECTRICAL CONSTRUCTION.

Application filed May 7, 1917. Serial No. 166,813.

*To all whom it may concern:*

Be it known that I, ARCHIBALD T. SAMPSON, a citizen of the United States, and resident of Lynn, in the county of Essex and State of Massachusetts, have invented an Improvement in Systems of Electrical Construction, of which the following description, in connection with the accompanying drawings, is a specification, like letters on the drawings representing like parts.

My present invention is an improved system of electrical construction and includes the provision of a novel system of conduits, outlet boxes, and connecting means between the conduits and boxes as well as between separate lengths of conduits, and also new and improved apparatus for electric connections without cutting wires and for fittings to lead and hold branch pendants, adjustable arms, or the like, and furthermore to bond the entire apparatus into one electrical unit.

In the systems of electrical installations for buildings, factories and the like as now employed with the open conduit work, it is customary to have the separate lengths of pipe or conduit cut and threaded together with correspondingly threaded unions and to cut and thread the abutting ends of the conduits at every outlet box or branch, whether switch, cutout, light or like cord pendants. This method is both expensive and objectionable, it being almost impossible to line up such fittings satisfactorily and to have them sustain the usual fixtures put upon them, as the continuous cutting and threading of the conduit pipes greatly weakens the mechanical strength of the same. Furthermore, each time a conduit is cut and threaded, the twisting and turning of threaded connections loosens the entire line. Wherever current is taken off the main wires of the conduit, it has heretofore been customary to take down the adjacent sections of pipe and cut out the same, thread and apply the threaded outlet box and refit the pipes thus prepared, disalining the entire adjacent piping. My invention obviates all these difficulties and by means of my improved system and apparatus I am enabled to install a system of electrical construction which may be entirely a "threadless" system, maintaining the conduit pipes unbroken excepting for slots cut therein, as will be explained, and providing a mechanically strong and unitary construction throughout. Furthermore, my improved system enables the abutting ends of conduit pipe or the junction of a conduit and an outlet box to be made without threaded connections, to insure increased strength at all such joints, and in addition thereto, providing a substantially waterproof, dustproof and perfect electrical bonding of the pipe sections, outlet boxes, branches and the like forming a conduit, so that the same may be used as one element of the electrical circuit, taking the place of the usual return wires now employed. In carrying out the invention of my improved system, I may employ the usual type of outlet boxes now in general use, or may utilize my novel form of outlet boxes and brackets which are specially applicable in my present system. I may also use the customary two-wire circuit now generally employed in the conduit work, similar to that herein explained, or may, and preferably will, so connect and bond the entire piping as to employ it as a return for the circuit. A further feature of the invention consists in my novel arrangement of supporting bracket and outlet box which constitutes a brace for the piping wherever the same is applied thereto, and actually reinforces the conduits instead of weakening them, as in prior systems; and a novel form of extension and supporting arm is preferably used in combination with my combined reinforcing outlet box and bracket. An additional important feature is the novel form of bonding piece which I have devised and which may be applied to any electrical wire without breaking the wires to be electrically joined. This is of especial value in numerous lines of electrical installation, greatly simplifying, cheapening and expediting the installation work, as well as greatly increasing the efficiency of any electrical system, where branch wires are employed.

Further features of the invention, important details of construction and novel arrangements and advantages will be hereinafter more fully pointed out and claimed.

Referring to the drawings illustrating preferred embodiments of the invention and the novel features of construction preferably employed therein, Fig. 1 is a view, on a reduced scale, of a portion of piping installation;

Fig. 2 is an enlarged cross sectional view of my improved type of threadless union for the abutting ends of conduit pipes;

Fig. 3 is a cross sectional view of a modified form of the same;

Fig. 4 is a view of a threadless connection between a pipe end and present type of outlet boxes;

Fig. 5 is a side view of my novel form of combined outlet box and reinforcing bracket;

Fig. 6 is a cross sectional view of the line 6—6 of Fig. 5;

Fig. 7 is a fragmentary view of another form of conduit and outlet partially prepared but not entirely cut through for the outlet; and Fig. 8 is a cross sectional view through the line 8—8 of Fig. 7.

In the accompanying drawings, I have indicated, in Fig. 1, a diagrammatic view of a portion of the piping installation which may be fitted to a building, factory or the like, along the sides or ceiling by means of brackets, and which conduits enclose the electrical wires. It will be understood that these conduits may be and usually are extended over long distances through different rooms, floors, partitions and the like wherever light or power is desired and outlet boxes are arranged at suitable intervals, from which branch wires may be connected to the main circuit wires within the conduit; switches etc. installed. Fig. 1 shows such piping formed in a plurality of sections 1, 2, 3 and 4, which pipe sections may be of any desired standard lengths, as two feet, four feet, eight feet, and the like, being united by my novel threadless unions at 5 and 6 or united by one of my improved outlet boxes at 7. Each section of piping may, and preferably will, have several slots cut therein which open the conduit pipes at different points, from which access to the wires may be had, and switches, pendants, etc., may be applied adjacent thereto. A plurality of such slots are indicated at 8, Fig. 1, being more clearly shown at 9, Figure 5. These slots do not sever the conduit 2 and may be of just sufficient depth to readily permit the work of connecting branch wires to the main wires carried through the conduit pipes. I contemplate the provision of a considerable number of such slots either partially or fully cut in the different lengths of piping so that after the pipes are installed such slots will be located at convenient distances for the taking off of power. Preferably these slots will be kept covered by a thin metallic segmental member 10 held in any convenient manner, as by a spring catch or lug formed directly on the cover at either end to keep out dust, dirt and moisture. If desired, these slots may be only partially formed, as by weakening the metal in the pipe, as shown in Figs. 7 and 8, as by grooving or boring partly through the same without entirely severing the section and thus eliminating the necessity of applying any cover 8 thereto.

In order to unite the ends of two pipe sections, without the necessity of twisting and turning the same, or taking down either or both pipe sections from their respective retaining brackets on the wall or building,—as is requisite in threaded unions,—I utilize my novel form of connection illustrated in Figs. 2 and 3. I first apply to the pipe ends a conical swage and flare out or open the end of the pipes 1 and 2 as indicated at 11 and 12, a single blow of a hammer upon the end of the conical swage usually being sufficient for this purpose. I then apply the abutting ends of the pipes 1 and 2, as thus flared outwardly, together, and fit thereon my novel form of union, comprising a pair of semi-circular clamps 13 and 14, each having a central concave recess adapted to receive the flared or swaged ends of the pipe and to be clamped together by a pair of bolts 16 and 17 projecting through lugs of ears 18 and 19 respectively in diametrically opposite sides of the clamps 13 and 14. This arrangement not only binds the flared abutting ends of the pipe sections together in a rigid and reinforced union, but also eliminates the necessity for taking down, threading, twisting and shortening the pipe section which has been already affixed to its brackets on the building. No change in all the fixtures, switches, fastenings, etc., of such fixed conduit is necessary by means of my present invention, and therefore no disalining of a previously installed part of the conduit piping is necessary, when adding another section or outlets.

In Fig. 3 I have illustrated a somewhat modified form of the clamping joint which gives a practically moistureproof and airtight connection. In this form of union the abutting pipe ends are swaged or flared at 11 and 12 in a manner already described, and a ring or gasket 20 of lead or other yieldable material is placed between the abutting ends of the pipes, before the clamps 13 and 14 are applied to the joint. If desired, in this type of connection, the central recessed portion 15 may be slightly lengthened or enlarged to give a short straight space for the yielding gasket 20, as indicated at 21, the inner beveled sides 22 serving to bear against the outwardly flared portions of the abutting pipe ends and force them together in a similar manner to the connection already described in the simpler form of clamps shown in Fig. 1. It is, of course, of great importance in electrical work, to maintain the conduit pipes moistureproof and yet it is well-known that the ordinary threaded connections heretofore employed are not sufficient for this purpose. By means of my reinforcing and strengthening clamps, together with the yielding ringlike washer, such as a leaden member 20, firmly drawn together both longitudinally and diametrically, a substantially perfect joint is obtained.

In Fig. 4 I have shown the method of connecting union embodying my invention in using the ordinary type of outlet box or coupling 7 now generally employed, illustrating the adaptability of my threadless installation system to utilize the present type of fixtures where it may be desired. The abutting end of the pipe 3 is swaged at 23 to flare out the ends and the clamps 24 and 25 having co-operating enlarged central portions 26 and 27 to receive the flared ends are provided. Preferably these clamps are also shouldered, as indicated at 28, so that the abutting flared end of the pipe 3 may be firmly and securely seated therein. The bolt 29 passing through lugs 30, 30, on said clamps 24 and 25 act to hold the same in position in a manner similar to that already described in connection with the construction shown in Figs. 2 and 3. The inner end of the clamped members 24 and 25 are also preferably swaged or flared outwardly as shown at 31 having a substantially continuous flange 32 and 33 around each respective clamp 24 and 25 to give a seat, brace, and stop, for the sides of the outlet box 7, to which the conduit is to be attached. It will be understood that the diameter of the clamps 24 and 25 should be of appropriate size to fit in the outlet box opening to which the pipe 3 is to be connected. At the abutting faces of the clamps 24 and 25, as indicated at 34 and 35, I provide a sufficient recess or space to permit the flared ends 31 of the two clamps 24 and 25 to be tilted and fitted into and through the outlet opening, whereupon the other ends of the clamp are brought together about the adjacent flared end of the pipe 3 and this operation acts to firmly unite and bind the clamps to the outlet box, as will be clearly understood on reference to Fig. 4. Thus I can use my system of installation, either with ordinary type of outlet boxes, or with my novel type of reinforcing outlet, brace and bracket.

From the above it will be obvious that, in practicing my improved process, I provide a plurality of metallic conduits, weaken a portion of such conduits at a plurality of points along the length thereof, install such conduits in a building or other structure in the usual manner, place electric feed wires in the conduits, and at any desired point along such conduits remove one of the weakened portions without injuring or destroying the wires that are now contained within the conduits, tap a branch lead onto such wires independently of cutting the same and then add means to clamp the outlet receptacle on the conduit from which the weakened portion has been removed.

The type of outlet box which I prefer to employ with my system is best illustrated at Figs. 5 and 6 and is adapted to be fitted about one of the slots 8 when the cover 10 is removed therefrom. Each slot 9 is cut partially into the piping and presents a substantially vertical portion 37 and 38 at either end. Around the slotted section of the pipe I apply my combined brace, bracket and holder 40 having its main portion shaped to fit the exterior contour of the piping 1 and with extending arms 41 and 42, said arms being clamped together and about the piping 1 by a pair of bolts 43, each bolt being in position through the arms 41 and 42, to engage the end walls 37 and 38, and thus rigidly secure the brace 40 and the pipe together. Furthermore, the rounded shanks of the bolts 43 constitute a valuable and convenient means for pulling the supply wires around them as a non-cutting bearing. The side arms 41 and 42 may extend downwardly as far as is desired to enclose switches, outlet connections or the like, and also may be utilized to secure and hold a supporting arm 44. To this end I prefer to flange the outer ends of the arms 41 and 42 as shown at 45, Fig. 6, so as to receive, retain and hold a plate 47 having side braces 48 and ends 49 thereon, to which the arm 44 is attached. These ends 49 are also shaped to fit snugly about the piping 1, where they overlap, as at 50, thus constituting a closure for the ends of the arms 41 and 42 and a rigid bracing means for the plate 47.

The arm 44 can be of any desired type or make, but I prefer to use a novel construction for such an arm, permitting a great range of flexibility, adjustability and increased strength. Said arm is formed of spirally overlapping metallic cut armor 51, giving any suitable length and carrying on its outer end a lamp socket or other electrical appliance 52.

In Figs. 7 and 8 I have illustrated a modified form of conduit pipe section with a prepared outlet portion, which portion, however, is not cut entirely through the pipe. An important advantage of this partially cut or prepared outlet portion is that the pipe is not materially weakened by such preparation, is maintained moistureproof, is smooth on the inside, as well on the exterior, the addition of a cover such as 10 is eliminated, and the extra cutting of the slotted portions 8 is actually eliminated where it is not necessary to cut the same. By using this form, I can fit the pipe 2 and afterward cut out the weakened section 108 along the grooved lines 109 and ends 110, 110, utilizing any type of tool for this purpose. The grooves or recesses 109 and 110 can be readily milled through the pipe to a predetermined depth, as clearly shown in Fig. 12, allowing for sufficient thickness of metal left in the pipe 2, which will maintain the portion 108 intact, preserve the strength of the entire pipe, and yet allow the section 108 to be readily removed "on the job." This feature I find of special importance in many lines of work, and as it is a distinct novelty, I also wish to claim the same broadly. In my copending application, Serial No. 344,927 filed Dec. 15, 1919 which is a divisional of the present application, I have described and claimed specifically my improved form of joint or coupling. This coupling is of special utility in connection with the improved system of electrical construction described and claimed in the present application.

My invention is further described and defined in the form of a claim as follows:

The improved process of electrical installation which consists in providing metallic conduits, weakening a portion of said conduit at a plurality of desired points along the length thereof, the weakened portions at such points constituting a portion of an outlet receptacle therefor, installing said conduits permanently in position in a building, placing electric wires therein, then removing any desired weakened portion without injuring or disturbing the wires contained within the conduits, making a connection between the wires in the conduit and branch wires, and adding means to complete the construction of an outlet receptacle over the portion of the conduit removed.

In testimony whereof, I have signed my name to this specification, in the presence of two subscribing witnesses.

ARCHIBALD T. SAMPSON.

Witnesses:
DUNCAN L. MACINTYRE,
HAROLD J. CLARK.